United States Patent [19]
Hagan

[11] Patent Number: 6,061,661
[45] Date of Patent: May 9, 2000

[54] SYSTEM FOR MONITORING INCREASING INCOME FINANCIAL PRODUCTS

[76] Inventor: Bernard P. Hagan, 1960 Broadway, San Francisco, Calif. 94109

[21] Appl. No.: 09/327,728

[22] Filed: Jun. 8, 1999

[51] Int. Cl.[7] ................................................... G06F 17/60
[52] U.S. Cl. ............................................. 705/35; 705/36
[58] Field of Search .................................. 705/4, 35, 36, 705/37, 38, 39, 40, 44; 707/1, 3, 10, 104; 709/217, 223, 227

[56] References Cited

U.S. PATENT DOCUMENTS

| | | | |
|---|---|---|---|
| 4,642,768 | 2/1987 | Roberts | 364/408 |
| 4,722,055 | 1/1988 | Roberts | 364/408 |
| 4,752,877 | 6/1988 | Roberts et al. | 364/408 |
| 5,291,398 | 3/1994 | Hagan | 364/408 |
| 5,592,379 | 1/1997 | Finfrock et al. | 705/39 |
| 5,631,828 | 5/1997 | Hagan | 395/204 |
| 5,864,685 | 1/1999 | Hagan | 395/235 |
| 5,893,071 | 4/1999 | Cooperstein | 705/4 |

OTHER PUBLICATIONS

Anonymous, "Private investment companies: A new business opportunity for banks?", Trust Letter, vol. 373, pp. 1–3, Dec. 1996.

Sages et al., "Considerations in choosing a common investment alternative", Trusts & Estates, vol. 133 No. 3, pp 45–53, Mar. 1994.

Duncan, John, "Investment pooling vehicles for private trust and banking clients", Trust Letter, vol. 380, pp. 9–13, Jul. 1997.

Primary Examiner—Emanuel Todd Voeltz
Assistant Examiner—Alexander Kalinowski
Attorney, Agent, or Firm—Robert C. Kain, Jr.

[57] ABSTRACT

The present invention responds to these administrative problems associated with an increasing income financial product and addresses deficiencies in the prior art. The data processing system and method according to a preferred embodiment of the present invention implements an investment account structure establishing and providing an increasing income financial product.

According to a preferred embodiment of the invention, each subscriber invests in a financial contractual product or program. Each subscriber designates primary and secondary beneficiaries. The primary beneficiary is assigned, along with a number of demographically similar beneficiaries, to a certain contract group. The financial product contract is funded with principal payments or premiums paid by subscribers. Income is provided according to the contractual terms or parameters to surviving primary beneficiaries of the same assigned contract group on an increasing, survivorship basis until (a) all the initial primary beneficiaries die; or (b) the contract expires based upon the expiration of pre-established time periods. When the contract expires, the designated secondary beneficiaries receive their pro rata share of the principal from the contract group.

11 Claims, 14 Drawing Sheets

SYSTEM FOR MONITORING INCREASING INCOME FINANCIAL PRODUCTS

BACKGROUND OF THE INVENTION

The present invention relates to a method for electronically processing transactional data and monitoring funds invested in an increasing income financial product.

U.S. Pat. No. 5,864,685 to Hagan discloses an increasing income trust computer transaction system and an insured investment account system. This patent disclosure relates to a certain financial product wherein a subscriber purchases an annuity contract or an irrevocable trust and identifies a primary beneficiary for that contract or trust. The primary beneficiary may be the subscriber or may be another party. Primary beneficiaries having actuarially similar characteristics are grouped together. "The trust corpus is funded with the annuity contract principal and/or the annuity contract income of subscribers. Each of the primary beneficiaries (typically the subscribers themselves, but possibly other individuals) receives payments from the trust income. As each subscriber dies, the trust income is distributed to the remaining primary beneficiaries. When the last subscriber dies, the trust corpus is distributed proportionally to secondary beneficiaries, typically the heirs of the primary beneficiaries." Col. 3, lines 51–60. Accordingly, the system described in Hagan '685 utilizes a data processing method which involves determining when the subscriber dies, computing increasing income trust fund payments to surviving subscribers who are grouped together in the same actuarial group as the decedent, and distributing the corpus of the trust, on a prorata basis, to all secondary beneficiaries upon the death of all subscribers in the actuarial group.

U.S. Pat. No. 5,631,828 to Hagan discloses a method and a system for processing federally insured annuity and life insurance investments. U.S. Pat. No. 5,291,398 to Hagan discloses a method and a system for processing federally insured annuity and life insurance investments. U.S. Pat. No. 4,752,877 to Roberts et al.; U.S. Pat. No. 4,642,768 to Roberts and U.S. Pat. No. 4,722,055 to Roberts disclose computer systems which monitor financial products. These products fund future events or expenditures. For example, if a person wanted to fund the college education of his or her child, the Roberts system provides a financial product which is monitored and maintained by a computer which collects premium from subscribers, projects the future cost of a college education and invests the premium payments and requests additional premium payments in order to achieve the subscriber's goal, to wit, to pay for the college. Roberts' system also discloses the funding of retirement and nursing home expenditures.

None of the aforementioned prior art patents disclose certain important data processing features which establish the viability, growth and continued maintenance of an increasing income financial product.

SUMMARY

The present invention responds to administrative problems associated with an increasing income financial product and addresses deficiencies in the prior art. The data processing system and method according to a preferred embodiment of the present invention implements an investment account structure establishing and providing an increasing income financial product.

According to a preferred embodiment of the invention, each subscriber invests in a financial contractual product or program. Each subscriber designates primary and secondary beneficiaries. The primary beneficiary is assigned, along with a number of demographically similar beneficiaries, to a certain contract group. The financial product contract is funded with principal payments or premiums paid by subscribers. Income is provided according to the contractual terms or parameters to surviving primary beneficiaries of the same assigned contract group on an increasing, survivorship basis until (a) all the initial primary beneficiaries die; or (b) the contract expires based upon the expiration of pre-established time periods. When the contract expires, the designated secondary beneficiaries receive their pro rata share of the principal from the contract group.

OBJECTS OF INVENTION

Thus, it is an object of the present invention to provide a data processing system and method for implementing and administering an investment account structure consisting of increasing income contracts whose commingled principal is invested in any legal investment.

It is a further object of the present invention to provide a data processing system and method for implementing an investment account structure consisting of contracts that pay out increasing income to the survivors and whose principal is subsequently distributed to the heirs upon expiration of the contract.

Another object is that the implementation provides minimum overhead charges and maximum security so that beneficiaries are fully informed regarding the increasing income feature. Therefore, the system provides periodic reports to subscribers or beneficiaries, advising them of their relative progress towards their goals. It also provides reports for system administration and auditing.

Yet other objects of the invention, its nature, and various advantages will be apparent from the accompanying drawings and the following detailed description of the preferred embodiments of the invention.

DESCRIPTION OF THE PREFERRED EMBODIMENTS

Figure 1:
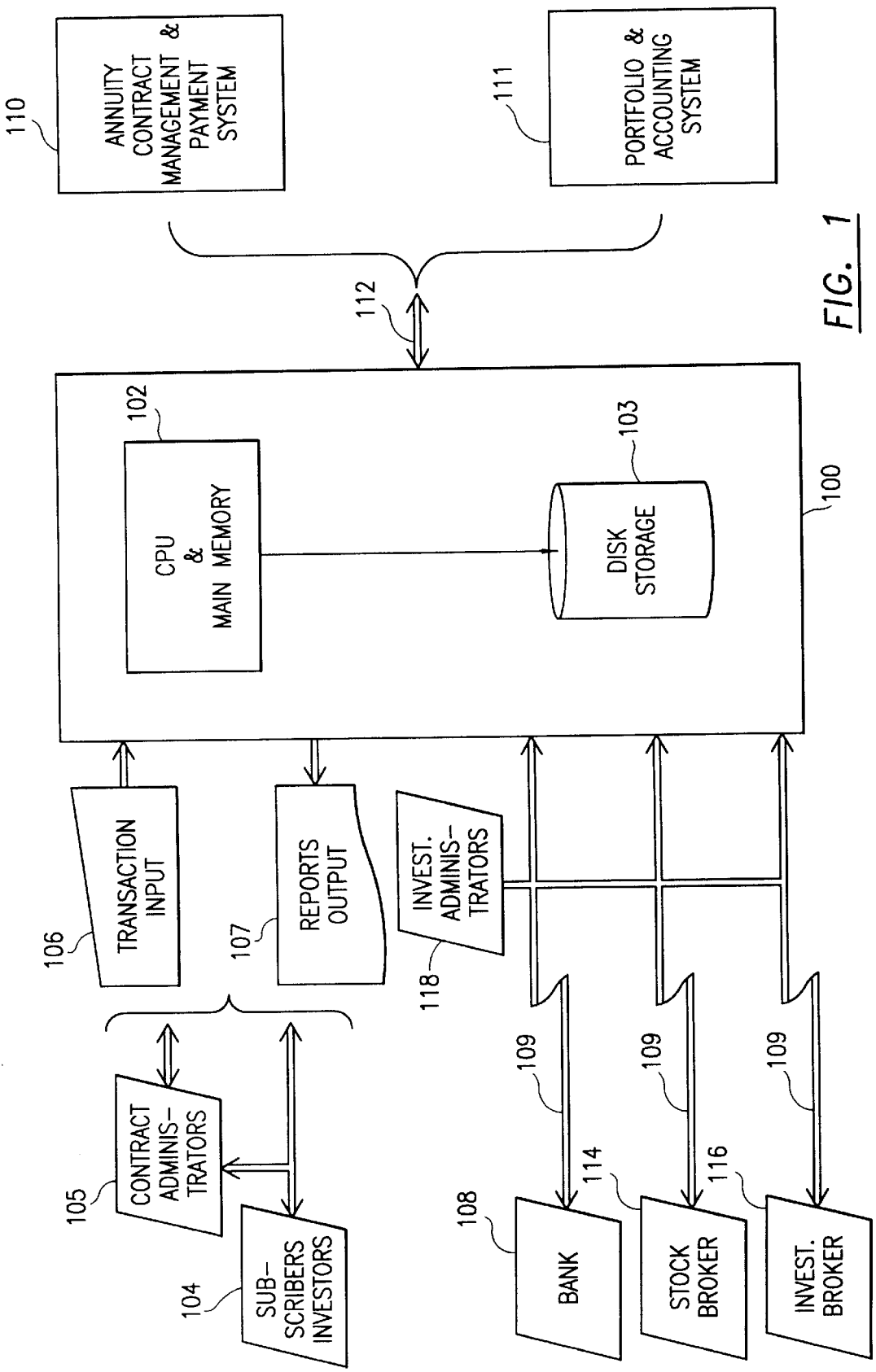
FIG. 1 is a schematic diagram depicting the flow of information using a data processing system or method according to the present invention.

The data processing system and method according the present invention is depicted as part of the schematic diagram of FIG. 1. Computer 100 comprises central processing unit and main memory (CPU) 102 and disk storage 103. Computer 100 may be, for example, a single sufficiently powerful computer or a network of computers jointly having sufficient power.

Data and instructions that implement the process and method are stored in disk storage 103. The data are preferably maintained in entity records that include descriptive data as shown in Table 1. The data can be organized as files, relational databases, or other equivalent structures.

TABLE 1

Entity Record Typical Descriptive Data (1) Subscriber Record
Name; address; primary and secondary beneficiaries; Actuarial or demographic data; contract group designation; contracts inchoate and owned;
Value of subscriber's total investment;
Percent principal (P) subscriber owns;
Net of all payments to and from the system.

(2) Contract Record
Owning subscriber; Contract terms or parameters; Payment history;
Principal value.

(3) Increasing Income Record
List of all primary beneficiaries assigned to contract group; Payment history;
Principal value.

(4) Investment Record
Name; address; investment data (characteristics, return on investment (actual and prospective), risk rating); time frame for investment;
Net investment; income generated; management fee data.

(5) Economic Forecast Record
Current and projected economic data (6) System Record
Current date; Total value of the system;
Total income for this period; Redemption data;
Funds available to invest.

The instructions are processed by CPU 102 and are broken into cooperating modules. A preferred functional decomposition is listed in Table 2. The instructions can be written in procedural, database, object oriented, or other equivalent computer OS language.

TABLE 2

Functional Module Typical Functional Content (1) Storage maintenance
Creates storage areas on the storage media; accepts transaction input data and updates storage areas; deletes storage areas.

(2) Premium computation
Accepts inflation and interest rate forecasts; computes premium to meet income target goal specified in constant dollars; alerts administrator and/or subscriber if goal will not be met.

(3) Payment tracking
Accepts payment data from contract and portfolio/ accounting systems; computes each subscriber's percentage ownership and funds available for investment by the system administrator.

(4) Increasing income and principal payment
Computes increasing income; generates orders to portfolio/accounting system to pay proportionate amount to surviving beneficiaries (5) Investment monitoring
Monitors investments to assure match with increasing income contract parameters; monitors economic conditions, return on investment (prospective and actual); generates orders to portfolio/accounting system to sell and/or buy if target values are not met.

(6) Investment
Invests funds available; generates orders to portfolio/ accounting system to buy the most attractive investments.

(7) Reporting
For each file or database, generates exception, detail and summary reports.

Alternative, equivalent organizations of data and instructions will be apparent to those skilled in this art.

The other elements of FIG. 1 depict the data flow environment of a system and method according to the invention. Subscribers or investors 104 typically correspond with administrators 105 who enter their requested transactions into the system. In a networked implementation, subscribers may deal directly with the system via home terminals. The administrators also enter transaction monitoring data and commands describing and directing investment in bank 108 (e.g. certificates of deposit), stock brokerages 114 (stocks, bonds), investment brokerages 116 (stocks, bonds, commodities, real estate) and investment contracts (described below), and are responsible for correct system functioning and auditing system transactions. Administrators 105 also handle and direct investments via investment administrators 118. In a large, widely held financial product system, investment administrators 118 may be investment advisors (e.g., Goldman, Sacks or Merill Lynch) or insurance companies (Aetna). The entering of transactions by administrator 105 is indicated at block 106, which could be a terminal or other input device. The system produces reports, as indicated at block 107, for administrators, subscribers and beneficiaries in any convenient output form (electronic, print or a combination). Investment administrators may also utilize similar inputs and outputs 106, 107.

The invention obtains data describing the investments in banks 108 and brokerage houses 114, 116 via communications link 109. Preferably, 109 is an automatic, telecommunications link. Alternatively, it could also require manual steps.

The system utilizes associated data processing subsystems that are known in the prior art. Contract management and payment system 110 is a subsystem for managing financial product contracts, receiving premium investments, making increasing income and principal payments, and tracking principal value. Portfolio and accounting system 111 is a subsystem for managing the investments, increasing income, and cash on hand. These subsystems may be implemented on computer 100. Alternatively, they may reside on a separate computer system communicating via communications link 112 with computer 100. In either implementation, contract system 110 receives from computer 100 data describing financial product contracts and sends to computer 100 data describing payment history and principal value of the contracts. Portfolio and accounting system 111 receives, from computer 100, data describing orders to buy or sell particular investments and sends, to computer 100, data describing income history and principal value of outstanding contracts and investments.

The following Abbreviations Table lists some abbreviations that are used herein.

ABBREVIATIONS TABLE

| | |
|---|---|
| JTROS | Joint tenant with right of survivorship |
| ROI | return on investment |
| i | income or increasing income |
| P | principal |
| Sub'r/inv'tr | subscriber - investor (may be any person or entity considered a primary beneficiary) |
| K | contract - any legal contractual system in Financial Products Table |
| demos. | demographics (a defined statistical grouping of human population, especially concerning vital statistics) |
| Prime Ben. | primary beneficiaries |
| incr. | increment, incremental, increase or increasing |
| 2d Ben. | secondary beneficiaries |
| min'm | minimum |
| max | maximum |
| mgt. | management, typically referring to management fee for operating system or managing money |
| exp. | expired |
| econ. | economic |
| invest. | investments |
| pmt. | payment |
| para. | parameters |

An important feature of the present invention is to group primary beneficiaries (which may be subscribers purchasing the financial product) together into similar demographic groups and utilize a single financial product contract for that group such that (a) the financial product generates increasing income for the primary beneficiaries (in accordance with the contract terms); (b) the increasing income is based upon a "survival theory" that is, primary beneficiaries that live the longest get increasing income from the pooled principal of the entire contract group because other beneficiaries in the contract group die and the income is divided among fewer and fewer beneficiaries; and, (c) when the contract expires per its terms (pre-established parameters), the principal is distributed to the heirs or the secondary beneficiaries. There are several variations of the financial product that are explained herein. These variations and the associated data processing method establish a viable and financially sound product for investors.

Several types of financial-contractual structures can be implemented to provide the increasing income product discussed herein.

Financial Product Table

- irrevocable trust
- annuity
  - life
  - term of years (e.g., 5, 10, 15 yrs.)
  - life plus survivor's life
  - life plus survivor's life limited by term of years
- life insurance
- mutual fund (closed end)
- limited partnership
- a contract
- any other type of legal contractual structure embodying the financial concepts described herein The terms "subscriber" and "investor" generally refer to the individual or entity funding or paying the premiums for the increasing income financial product. However, the subscriber may or may not designate himself or herself as a primary beneficiary to receive the increasing income. The terms "subscriber" and "primary beneficiary" are sometimes used interchangeably herein. The contract is based upon a grouping of "primary beneficiaries" as described hereinafter. Typically, the subscriber is the person or one of the people who receives the increasing income. The following table lists different types of primary beneficiaries.

Primary Beneficiaries Table

- individual subscriber/investor
- other person designated by the subscriber
- husband and wife with right of survivorship (JTROS)
- two individuals legally recognized as being equivalent to husband and wife with right of survivorship (JTROS)

It is important to note that reference to "a primary beneficiary" may be construed to cover two individuals, i.e. a husband and wife, even though a singular term "primary beneficiary" is used herein. If the primary beneficiary covers two people, the "primary beneficiary" does not die until the last of the pair dies.

Also, it should also be noted that a closed end mutual fund is designated as a "contract" herein. The contract defines obligations and rights of (a) the financial product administrator; (b) the subscriber; and (c) the primary and secondary beneficiaries. It is believed that mutual funds have sufficient legal contraints contained therein and may be broadly classified herein as "contractual" in nature. Hence, the mutual fund is a "contract" as it relates to the increasing income financial product described herein.

Figure 2:
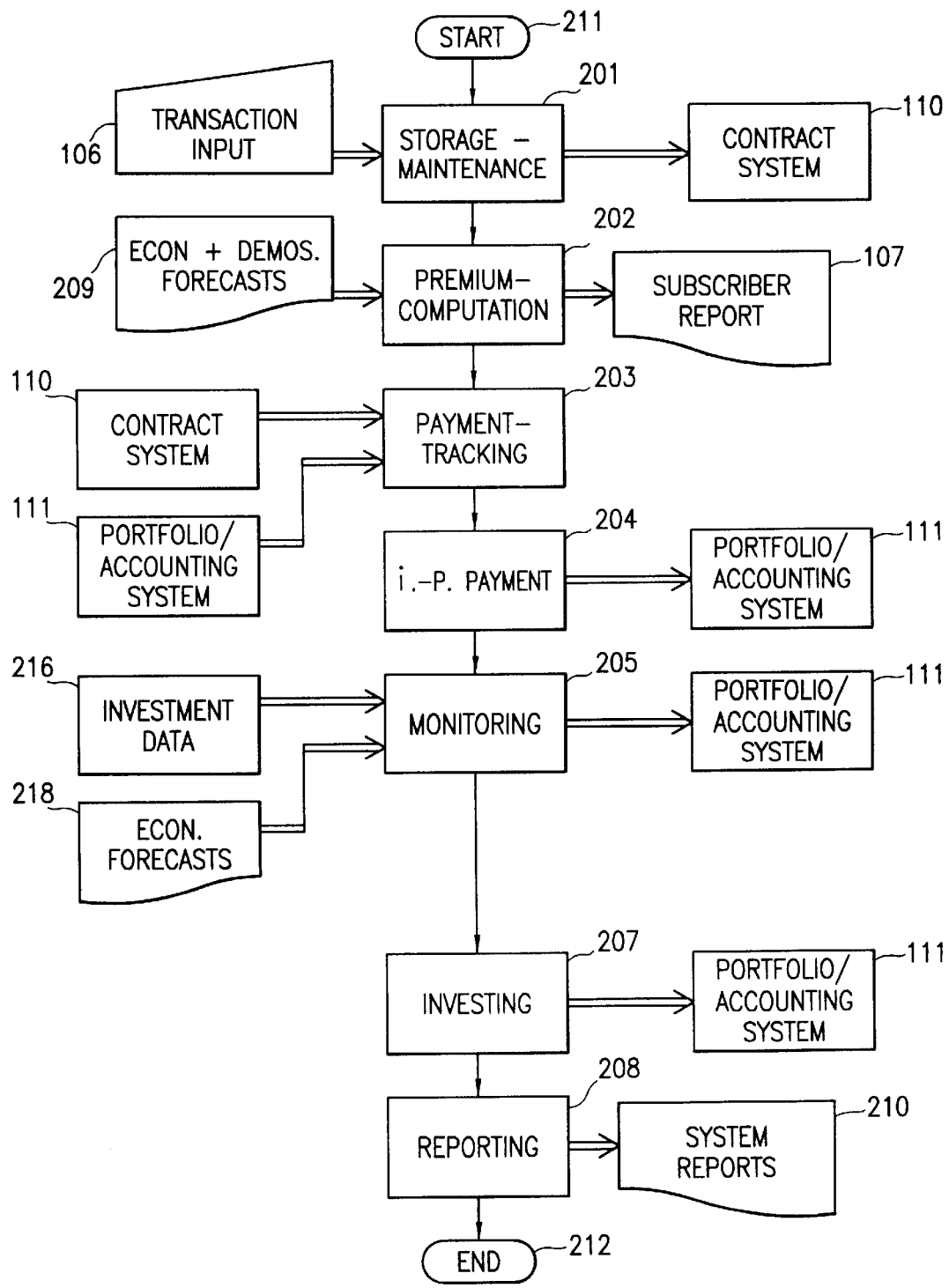
FIG. 2 is a flowchart of system functions as a data processing diagram according to the present invention.

FIG. 2 illustrates both the sequence of operations or method of a system according to the invention and the flow of external data into and out of the system. The function of processes at blocks 201 to 208 are described in Table 2, rows 1 to 7, respectively. If a system according to the present invention does not implement the economic analysis 209 feature, the economic analysis process in FIG. 7 (ROI exceeding contract parameter target) will not be present, nor will the pieces of any other process that are identified to process data representing economic analysis.

After one or more input transactions have been gathered as indicated at block 106, the system starts processing at block 211 and continues to storage maintenance process 201, where data is input to disk storage 103. After one or more transactions have been input at block 201, the succeeding processes, at blocks 202 to 208, are performed in the order illustrated. The system stops at block 212. Preferably, these processes would be performed at an appropriate interval, at least monthly but perhaps weekly or daily, depending on the frequency of transaction input, premium and income payments, and other system events. External data representing investments (prospective and existing) is input at function block 216. In a like manner, general economic data or forecast is input at block 218. This economic data includes, but is not limited to (a) consumer and manufacturer's price indices, (b) inflation, (c) interest rate, (d) stock and commodity indices and (e) other economic data generally relied upon to base investment.

Figure 3:
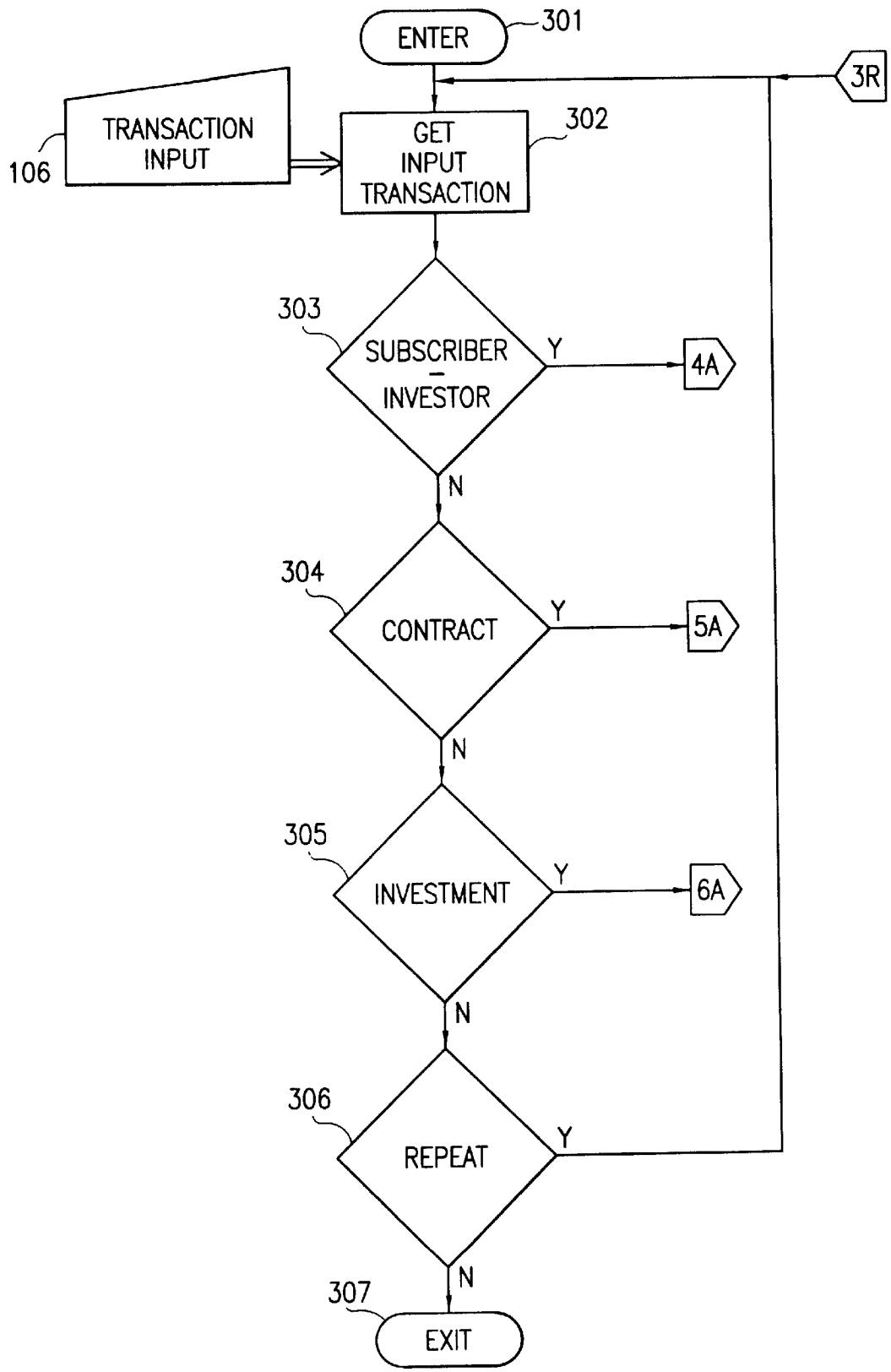
FIGS. 3, 4, 5, and 6 are flowcharts depicting storage maintenance processing systems, with FIG. 4 further depicting the system processing of subscriber transactions and FIGS. 5 and 6 further depicting contract and investment transactions systems.

A detailed description of the storage maintenance means is depicted in FIG. 3. Storage maintenance means processing begins at block 301 and ends at block 307, after which the system proceeds to the next sequential process. Transaction data is input as indicated at block 106 for processing at block 302. At block 303, the system checks if the transaction is for a subscriber. If so, processing proceeds, as indicated label 4A, to continue as described in FIG. 4. If not, as indicated at blocks 304 and 305, the system checks for contract or investment transactions, respectively, and proceeds, as indicated at labels 5a or 6a, respectively, to continue as described in FIGS. 5, 6. If the administrator requests a repeat, as indicated at block 306, the system will branch to data input at block 302, else storage maintenance processing exits at block 307.

Figure 4:
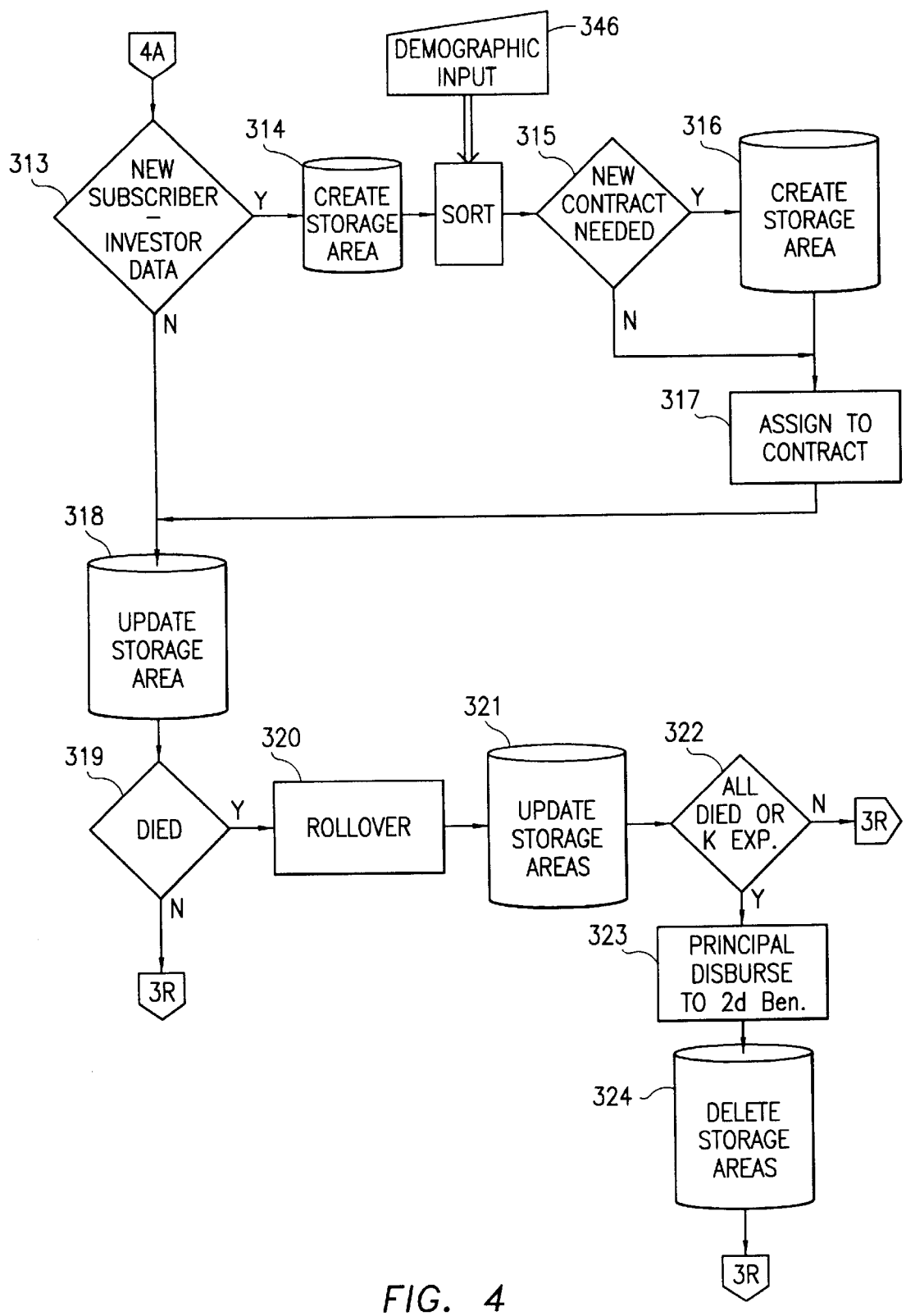

Now referring to FIG. 4, if a subscriber or investor transaction has been input, at block 313 the system checks for a new subscriber. If so, then a new storage area for this subscriber is created at block 314 to contain data similar to that listed in Table 1, row 1. This data includes designating primary and secondary beneficiaries. Other data may be required as set forth below. The new primary beneficiary must be assigned to a contract. Herein, reference is sometimes made to assignment or segregating beneficiaries into contract groups. Sort function 344 represents this segregation by demographic characteristics. Necessary external data input is obtained at block 346. At block 315, the system checks if a new contract is needed, and if so a new storage area for this contract is created at block 316 to contain data similar to that listed in Table 1, row 3 and as set forth herein. The system assigns the beneficiary to a group at block 317. The process indicated at block 318 updates these new storage areas.

Characteristics of Contract Group

Age (e.g., year of birth (single year bracket), multiple age brackets (e.g., 2 year age brackets, 5 year age brackets or multi-year grouping))

Sex married—unmarried—divorced or separated

Race (if legally considered non-discriminatory)

Ethnic Background (if legally considered non-discriminatory)

Residence (city, state, region and/or country)

Health (potentially requiring a health certificate executed by a professional)

Smoker/non-smoker

During the development of the increasing income financial product, it was noted that there may be times when the financial product administrator would accept funds from a subscriber (associated with a designated primary beneficiary) but the administrator did not currently have an "open" increasing income contract for that primary beneficiary. In other words on a simplistic basis, the increasing income financial product does not operate properly until a reasonably large number of primary beneficiaries (supported by funds from subscribers) are gathered together in a singular contract group. Accordingly, contract inception parameters are necessary to assure the viability or financial health of the increasing income financial product. For example, the administrator may determine, based upon a subscription unit value of $10,000.00 (minimum premium) that at least 100, but not more than 500 primary beneficiaries must be assigned to a particular contract group represented by a respective contract. Accordingly, the inception parameter for that contract would be either 100 primary beneficiaries or $1,000,000.00. The $1,000,000.00 financial pool minimum is based upon a minimum investment criteria established with the advice of investment administrators 118. The term "inception" as used herein refers to the beginning of an obligation, on the part of the administrator, to pay increasing income based upon contractually established events or parameters to primary beneficiaries in a certain contract group. In other words, the "inception" refers to the period wherein the primary beneficiaries could, under some possibility, receive increasing income. If the increasing income is delayed for a predetermined number of years or during a "quiet time" when no primary beneficiary receives any "increasing" income, the "inception date" for the respective contract and contract group begins at the beginning of the quiet period.

In a similar manner, the administrator does have financial obligations to subscribers who have provided funds to purchase the increasing income product prior to the inception of the increasing income period pursuant to the contract. Of course, if the contract does not become "effective" until 100 primary beneficiaries are identified and funded by subscribers, the administrator must refund or return earlier subscriber's funds in the event the respective contract does not enter into its "inception phase" due to an insufficient number of subscribers/primary beneficiaries for that designated contract group. A time period may be associated with this "refund period" prior to inception of the contract. These contracts are called herein "inchoate contracts."

In the event the administrator accepts funds from a subscriber and the system does not have an "open" contract, the funds are placed in escrow, information regarding the funds and potential new increasing income contracts are placed in storage area 316 until the minimum number of subscribers/primary beneficiaries is obtained for that increasing income contract. At that point in time, the inception period for the increasing income contract begins, the contract is "open" and the previously identified and sequestered funds are thereafter released for investment purposes by the administrator. In an advanced system, the sequestered funds may be conservatively invested. When the contract is "open," beneficiaries' rights are no longer inchoate.

In a popular demographic group, the new subscriber/primary beneficiary may cause an unacceptably large number of beneficiaries for a particular contract group. In other words, if adding the proposed beneficiary to the existing contract group (n+1) exceeds a predetermined maximum number of beneficiaries or a predetermined total dollar amount for that contract (for example, $10,000,000.00), the contract is "closed" and the proposed primary beneficiary/subscriber must be designated for another increasing income contract. These contractual conditions are called "closure parameters" herein. This may result in activating the inception parameter conditions prior to opening a second increasing income contract for that proposed beneficiary. Closure parameters include (a) a maximum number of primary beneficiaries in a contract group and/or (b) a total monetary limit associated with the particular increasing income contract for a respective contract group. Other contract closure parameters may be specified in the increasing income contract such as external economic consideration (interest rate exceeding a predetermined annual amount) or, civil disruption or commotion, war, or other factors identifiable in the increasing income contract. The New Contract Inquiry Parameter Table set forth below identifies some critical concepts.

New Contract Inquiry Parameters no match beneficiary age with existing contract or contract group having similar age parameters n+1 is less than minimum beneficiaries for a contract group n+1 exceeds maximum beneficiaries for selected contract new beneficiary does not match other contract group characteristics for any open contracts (sex, age, race, health (good or predetermined health condition (e.g. terminally ill with a certain disease))

It should be noted that the increasing income financial product may be sold not only to healthy individuals (beneficiaries) but also individuals who are subject to certain diseases, especially terminal diseases. For example, based upon the demographics and survival characteristics of persons with Acquired Immune Disease Syndrome (AIDS), the increasing income financial product may be particularly attractive. A key concept in the viability of the financial product is the theory that the beneficiary, designated by the subscriber, will survive a longer period that other similarly situated beneficiaries. Particularly, healthy individuals will make more money from the increasing income product as compared with less healthy individuals. However, since health is a relative concept, terminally ill patients such as AIDS patients, may readily participate under the theory that if they do survive a long period of time, they will be financially rewarded. This may provide an incentive to comply with aggressive medical treatment. In such a situation, a physician's certificate certifying that the primary beneficiary has a certain health condition would be appropriate. Further, the demographic input in block 346 is meant to encompass changing survival rate data and factors from the general populace which may affect the inception or closure of a particular contract group for an increasing income financial product. The administrator may be contractually permitted to "close" the contract group based upon demographic or survival rate data without resort to fixed a number of participants or time factors.

The New Contract Inquiry Parameter Table set forth above identifies some major concepts regarding whether or not a new increasing income contract is necessary based upon a proposed primary beneficiary designated by a paying subscriber.

Process at block 317 assigns the new subscriber to a contract, that consists of up to approximately 200 other subscribers/beneficiaries with similar demographic or actuarial characteristics and equal investments. Other participation limits may be established. This grouping of beneficiaries may be done by consulting mortality tables indexed by the chosen actuarial characteristics and picking only subscribers/beneficiaries with expected time until death in a fixed narrow range. For example, a given financial product contract may contain only subscribers with expected time to death of 30 years to 30 years and six months and investments of $500,000. Another contract group may have minimum investment units of $10,000.00 but the inception criteria may be set at 500 subscribers or beneficiaries.

At block 319, the system checks for a transaction indicating the death of a beneficiary or expiration of the contract. If not, subscriber transaction processing is complete. See return 3R to FIG. 3. If so, then this beneficiary's remaining principal must be rolled over into the assigned contract group principal by the process at block 320. By rolling over the principal, all future income from the contract group principal is paid to survivors in the group. This requires increasing income and contract storage area update at block 321. This event also results in higher income payments being made to the remaining primary beneficiaries or subscribers.

The system performs a further test at block 322 by fetching all the subscriber/beneficiary storage areas assigned to the contract updated at blocks 320 and 321 and checks to determine if the designated beneficiaries have all died or if the contract has expired by its terms. If not, processing is complete, and the system returns, as indicated at label 3R, to continue as indicated in FIG. 3. If so, then this contract must be terminated, as indicated at block 323; specifically, the contract principal is distributed ratably to the ultimate beneficiaries (secondary beneficiaries) specified by the subscriber areas tested at block 322. This is the expiration of the contract. Then, at block 324, all data areas for this contract and these subscribers are deleted from the storage means.

Contract Expiration Table

Figure 5:
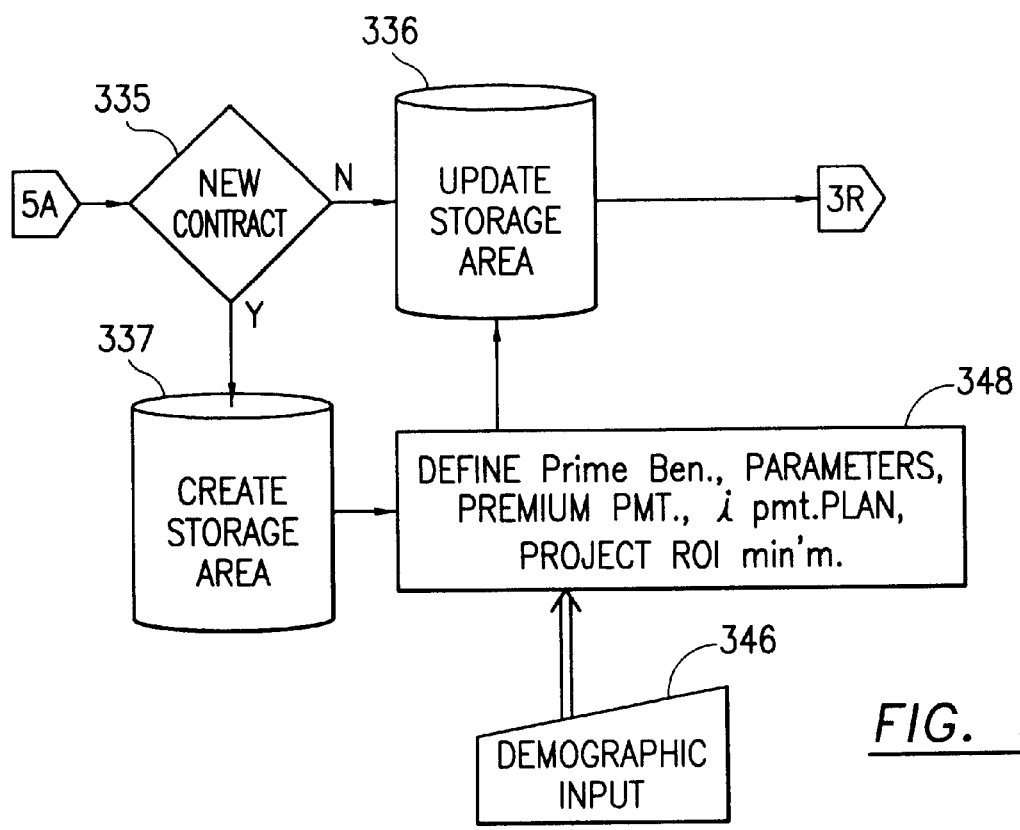

Contract expires when:
   all subscribers/investors in contract group die
   set term of years from inception or closure of contract
   the earlier of a set date or a term of years after inception or closure of a contract Turning now to FIG. 5, if a contract transaction has been detected, processing continues at connector 5A. At block 335, the system checks for a new contract, and if so, a new storage area for this contract is created by 337 to contain data similar to that listed in Table 1, row 2 and as described herein. Prior to inception of a contract, a "hold funds" or "inchoate" storage area is utilized. A contract transaction will occur when a subscriber pays a recommended premium to administrator for the increasing income product. Finally, as indicated at block 316 (FIG. 4), the system updates the contract storage area with the input data. With every new subscriber/beneficiary, contract parameters or conditions must be met, premiums may be a subscriber, increasing income plans selected (e.g. (a) pay income from inception to death; (b) delay payments for x years, then pay income until death; (c) pay a reduced income level for y years, then increase income to full "survivor" value until death), and (d) income target values for the contract selected. Further, if the product pays income from inception through death, invasion of principal parameters should be selected by the subscriber/beneficiary. The following contract matrix table lists major parameters or elements to be selected. "ROI" refers to return on investment targets.

CONTRACT MAINTENANCE TABLE

| Beneficiary/ROI | Income | Invasion of principal |
|---|---|---|
| n primary beneficiaries | now or after x years | no |
| n min'm Prime Ben. | whatever | yes |
| n min'm Prime Ben. | whatever | no |
| n max'm Prime Ben. | whatever | yes or no |
| n min'm and max'm plus ROI target | preferred % P (no guarantee) | probably no |
| n min's and max'm plus min'm ROI | within pre-set limits (inc. income capped) | probably no |
| n - plus min'm ROI | only min'm limit | yes |
| n - plus min'm ROI | no limits | yes |

By providing a variety of increasing income products for the same beneficiary contract group (e.g. males 50–52 years old), the administrator can provide an "aggressive" product (i.e., invasion of subscriber's principal, no upper limit on increasing income) and offer to the same subscriber/beneficiary a "conservative" product (i.e., no invasion of principal, income based exclusively on survivorship). Other combinations are possible as outlined above in the contract matrix table.

The following Premium Payment Fable provides options for funding the financial product.

Premium Payment Plans lump sum
periodic payments for term of years

Figure 6:
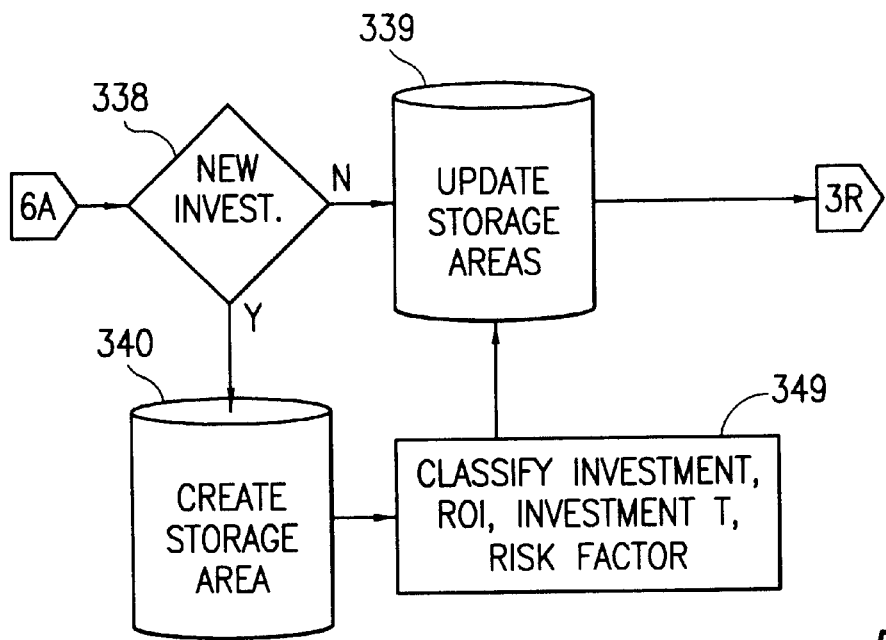

If an investment transaction has been detected, processing continues in FIG. 6 as indicated at label 6A. At block 338, the system checks for a new investments, and if so, a new storage area for this investment is created at block 340 to contain data similar to that listed in Table 1, row 4 and as set forth herein. A new investment will be utilized when the administrator decides that (a) the return on investment or "ROI" is insufficient; (b) the future ROI projections are insufficient; (c) the investment is liquidated in accordance with its customary terms (e.g., expiration of a certificate of deposit or an option); or (d) the projected ROI, plus or minus a tolerance factor and the economic forecast data shows an inability to meet contractual increasing income obligations. Block 349 classifies the investment as, for example, aggressive, intermediate, conservative, income generating or capital accumulation, sets investment time frame T and logs in data relating to risk factors (statistical analysis based upon investment benchmarks, e.g., volatity versus S & P 500 stock index.) Finally, as indicated at block 339, the system updates the investment storage area with the input data. Processing then returns to FIG. 3, as indicated at label 3R.

Figure 7:
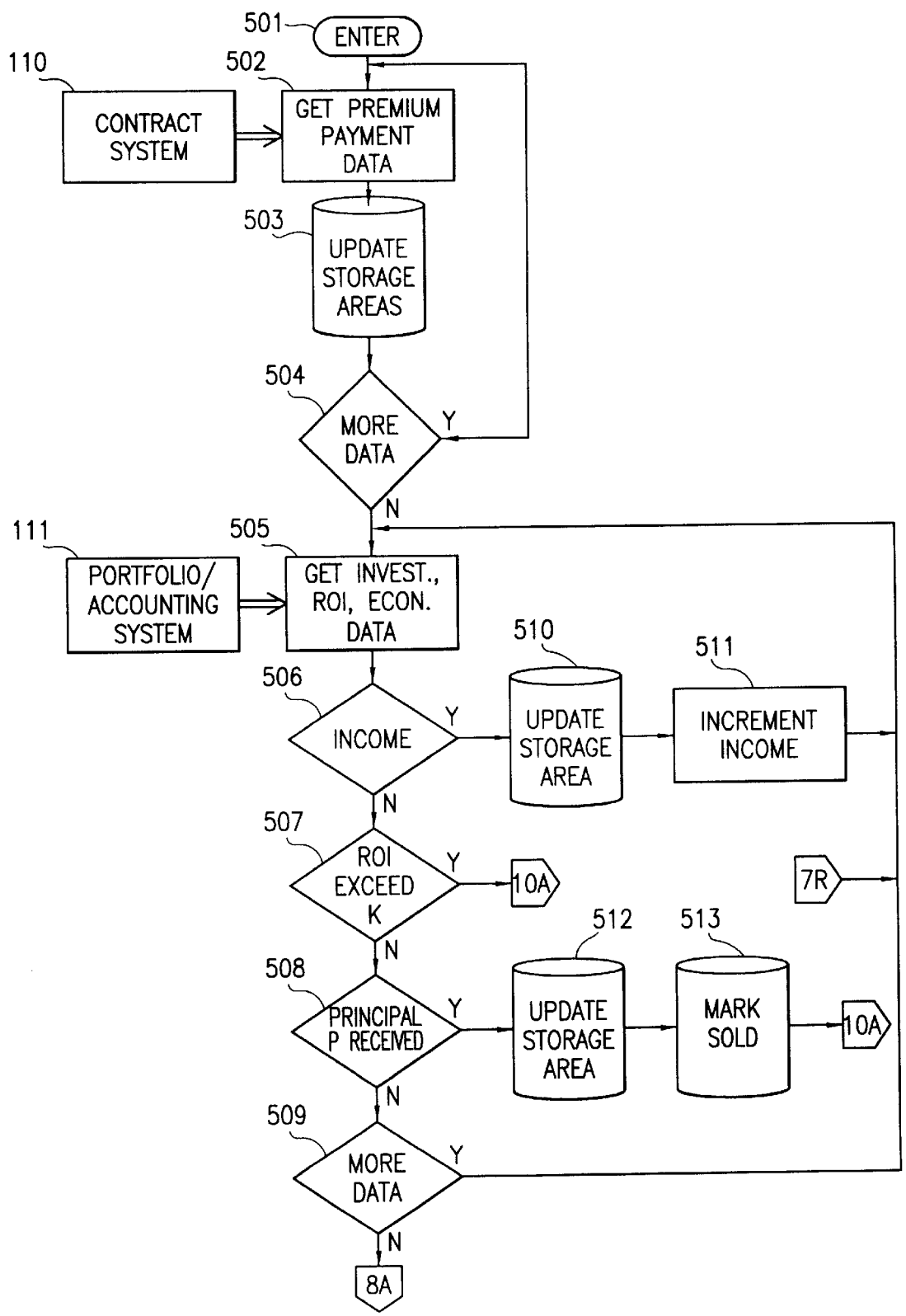
FIG. 7 is a flowchart depicting premium processing and investment processing systems.

A detailed description of the premium computation system and methodology is depicted in FIG. 7. Premium computation processing system begins at block 501 and ends at block 504, after which the system proceeds to the next sequential process. Beginning with a storage area fetch as indicated at block 502, the system proceeds through to block 503 in implementing a scan of all subscriber storage areas in disk storage 103. For each subscriber area, the process fetches all the contract data for this subscriber at block 502. A feature of this invention is this periodic update in steps and sub-systems 502, 503 inform each subscriber of progress towards income goals by reviewing contract premium commitments. As set forth above, some subscribers fund the financial product contract with a lump sum. This funding is expected to be typical. Others may fund the contract with periodic payments, in the nature of insurance financial products. If deficiencies are identified, the subscriber is informed and correction options recommended by report, as indicated at block 1002 in FIG. 13.

The investment performance system is depicted in FIG. 7, blocks 111, 505 through 513.

At block 505, the system obtains from external sources relevant economic forecasts, particularly inflation, interest rate, GDP and economic growth forecasts for future years. Additionally, the system obtains return or investment or ROI data in function block 505.

Data input at block 505 and the test at block 509 implement a loop to extract all portfolio and accounting investment data accumulated for this period (daily, weekly, monthly, etc.) from portfolio and accounting system 111. At blocks 506, 507, and 508, the system determines whether the payment of investment income is received, ROI exceeds the contract parameters, or principal is received (a) from a subscriber due to the purchase of the increasing income financial product; or (b) sale of an investment, respectively. For income received, as indicated at block 510, the system updates the income payment history for the particular investment in the storage area for the particular contract involved. Then, at block 511, the system accumulates the total income received by the benefit structure in this period by summing the income for all contracts. This information updates the system record, which contains data similar to Table 1, row 6.

Figure 10:
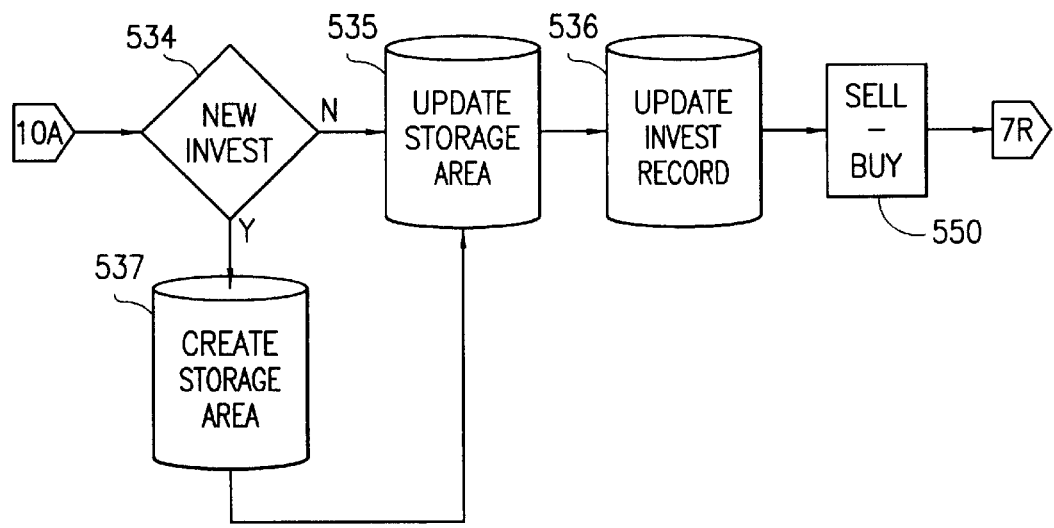

FIG. 7 is linked to FIG. 10 via link 10A. FIG. 10 depicts system processing for monitoring investment performance ROI. At block 534, the system determines whether a new investment is involved. If so, a storage area for the contract is updated at block 537 to mark the investment data as a "watch ROI" and list that "watch" or warning data with the data listed in Table 1, row 4. If the investment does not exceed ROI expectations (test 507, FIG. 7) and an old or a previous "watch ROI" is noted with the investment tested in block 534 or detected ROI is far below expectations, a new contract storage area is created at block 535 and the investment record storage area is updated by 536. ROI data is updated at block 536 to reflect the new information. Block 550 directs the financial product computer system to sell and buy investments to meet (a) actual increasing income target values with sufficient ROI (received investment income and/or realized capital gains from investments) and (b) projected income targets based upon actual plus projected ROI for investments.

For prospective economic and ROI analysis, the investment storage area is updated to reflect a possible "ROI watch" at block 513 to reflect the potentially new problem to meet the contractual commitments for increasing income.

Returning to FIG. 7, test block 508 determines whether investment principal has been received. Typically, this is due to the sale of an investment. However, the receipt of subscriber premiums also reflects the receipt of principal. The appropriate storage area is updated in block 512, and the investment is marked SOLD in 513. The system then jumps to FIG. 10, the sale, purchase and selection of new investments to meet (a) current income targets with current ROI; (b) projected targets with future ROI; and (c) redemption and sales of the product by subscribers. Current redemption and refunds may also be paid out of income.

Figure 8:
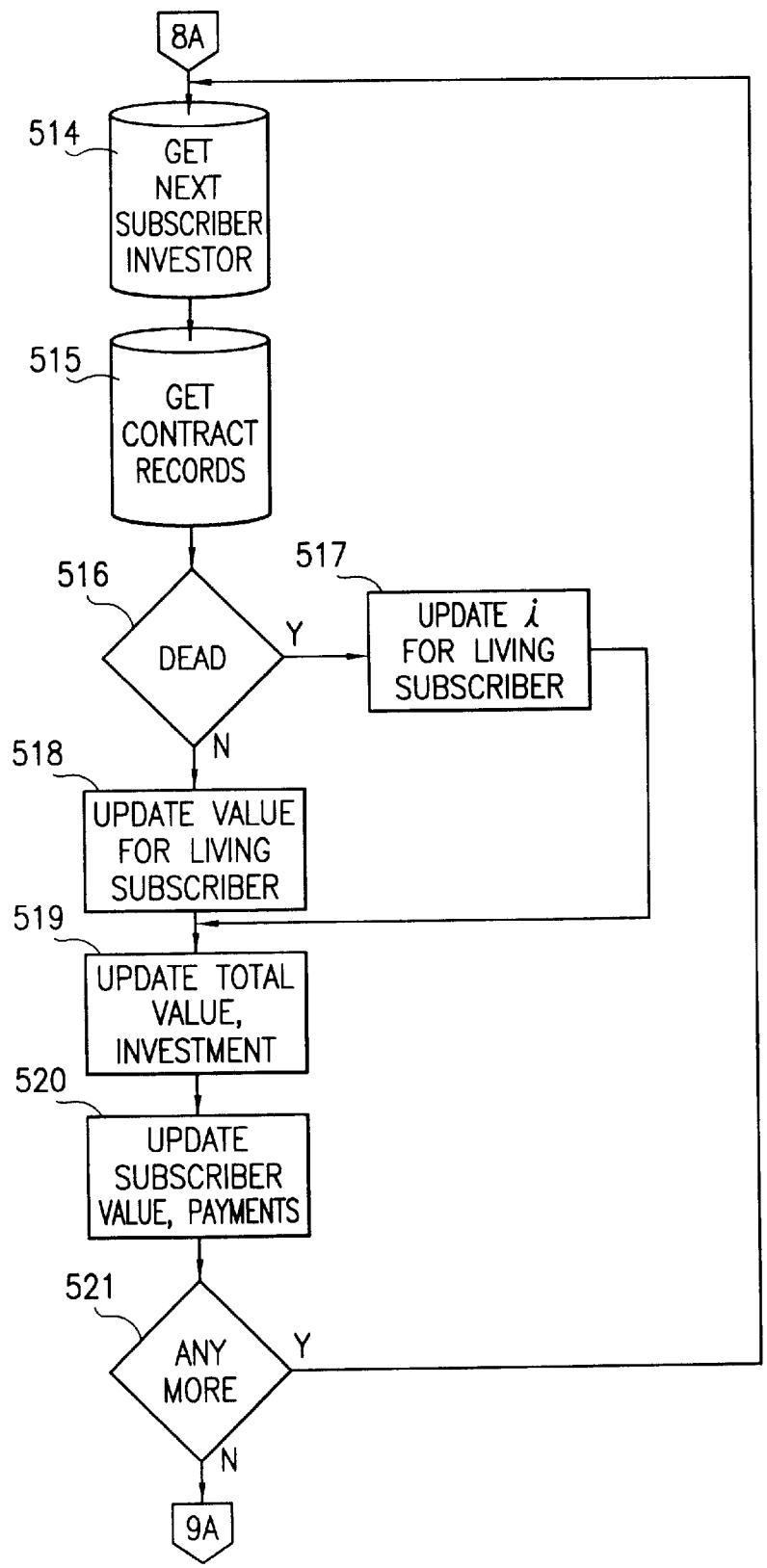
FIGS. 8, 9, 10 and 11A and 11B are flowcharts depicting processing and payment tracking systems, the system processing of current investments, new investments, increasing income payments and reporting the same as part of a portfolio/accounting system, and the processing of new contracts.

Turning now to FIG. 8, beginning with a storage area fetch as indicated at block 514, the system proceeds through block 521 to implement a scan of all subscriber storage areas stored in disk storage 103. For each subscriber area, process steps as indicated at blocks 515 to 520 are performed to determine the current value of each subscriber's or beneficiary's total investment in the benefit structure, the total value of the benefit configuration, and the net total of all subscriber payments. All the subscriber's contract storage areas are fetched at block 515. Subscriber net total payment is computed from these areas. The value of the total principal investment of a dead subscriber/beneficiary, tested at block 516, is simply the final principal balance of all subscriber owned contracts, which is updated at block 517. For a living subscriber/beneficiary, the current income "i" value of all contracts is computed, by means known to those of skill in the art, at block 518. The survivors in the contract group will receive greater income "i" payments due to the death of a contract group member. At block 519, the subscriber total investment current value and net payments are updated. At block 519, all the subscriber values and payments are summed to obtain the total value of the investment structure and the total net payment into the structure. These values update the system record.

Figure 9:
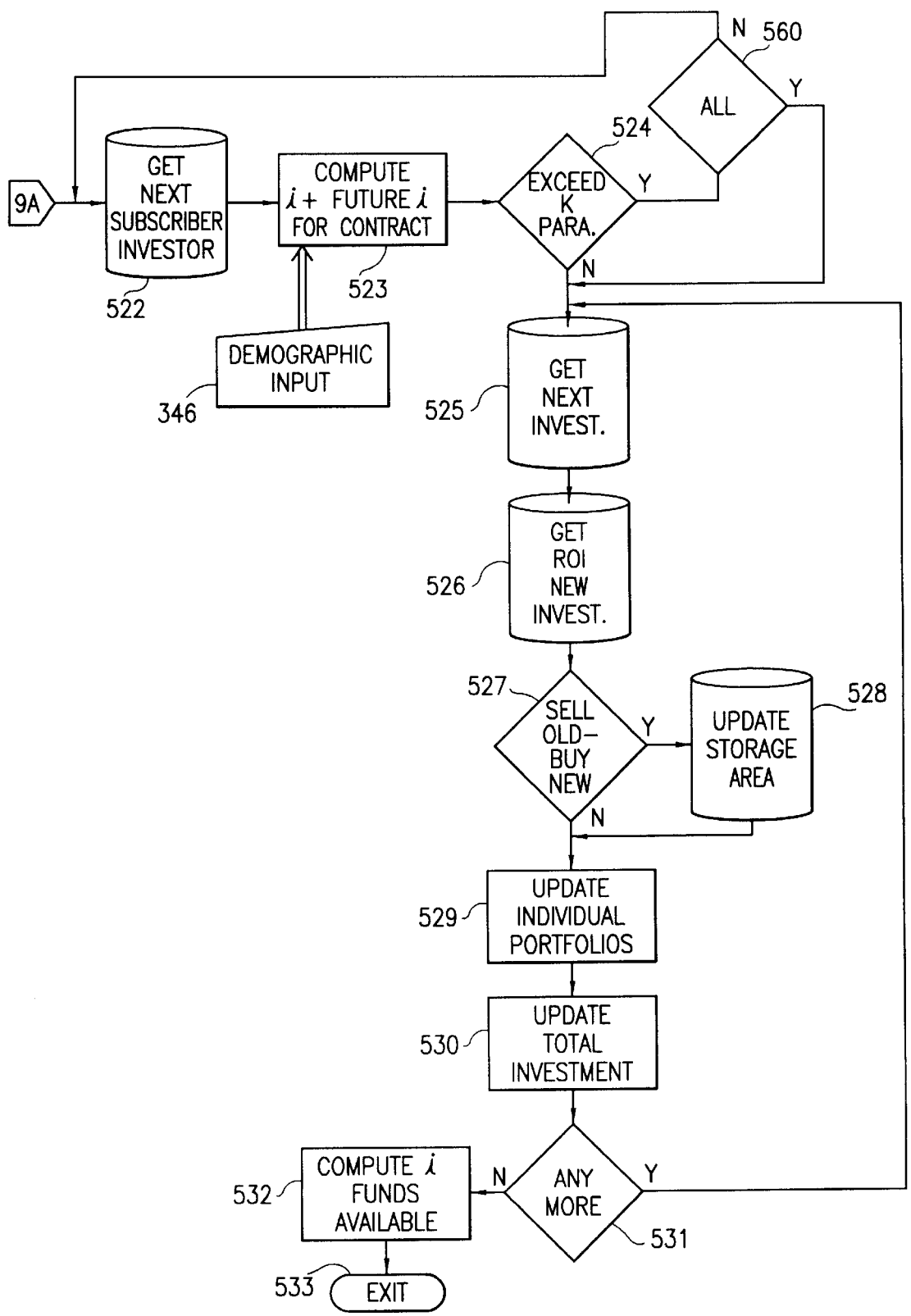

Payment tracking and demographic versus ROI and increasing income commitment processing system continues as depicted in FIG. 9. Beginning with a storage fetch at block 522, the system proceeds through block 524 and complete scan test 560 to implement another subscriber storage area scan during which each subscriber's/beneficiary's increasing income "i" from the benefit structure is computed at block 523. This is simply done by dividing the total value of investment group income by the total number of surviving subscribers/beneficiaries in the group. Economic factors, projected ROI and demographic data 346 are also accounted for by the input to block 523. That block computes current income commitments, funded by current ROI, future commitments which may be contingent upon the demographics or projected survival rate for the contract group dependent upon the contract parameters. Test 524 assures compliance with income target parameters, whether guaranteed or not, in the respective contracts.

Beginning with a storage area fetch at block 525, the system proceeds through block 531 to implement a scan of all investment storage areas stored in disk storage 103. For each investment area, process steps at blocks 526 to 530 are performed to determine the current ROI for each new investment in each contract group, the economic forecast relevant to the new investment and the increasing income commitment for that contract group. This process and subsystem establishes the stability of the benefit structure. This feature is carried out by fetching all ROI and relevant economic forecast data (if this forecast is included as part of the system) for each contract group as indicated at block 526. If an ROI of an investment does not exceed a target income level for a certain contract group (whether the income is guaranteed or simply estimated by the financial product administrator), a sell order is generated 527, a new investment is identified with an appropriate ROI and a buy order is generated. If contract funds are reinvested, at block 527, its storage area is deleted at block 528. The total of all individual investment portfolios from all the contract updates in the investment record are updated at block 529. The investment totals are then summed to compute the total system increasing income and principal values at block 530. This information updates the system record.

Finally the income generated funds from the investment are computed at block 532. This information also updates the system record.

Figure 11A:
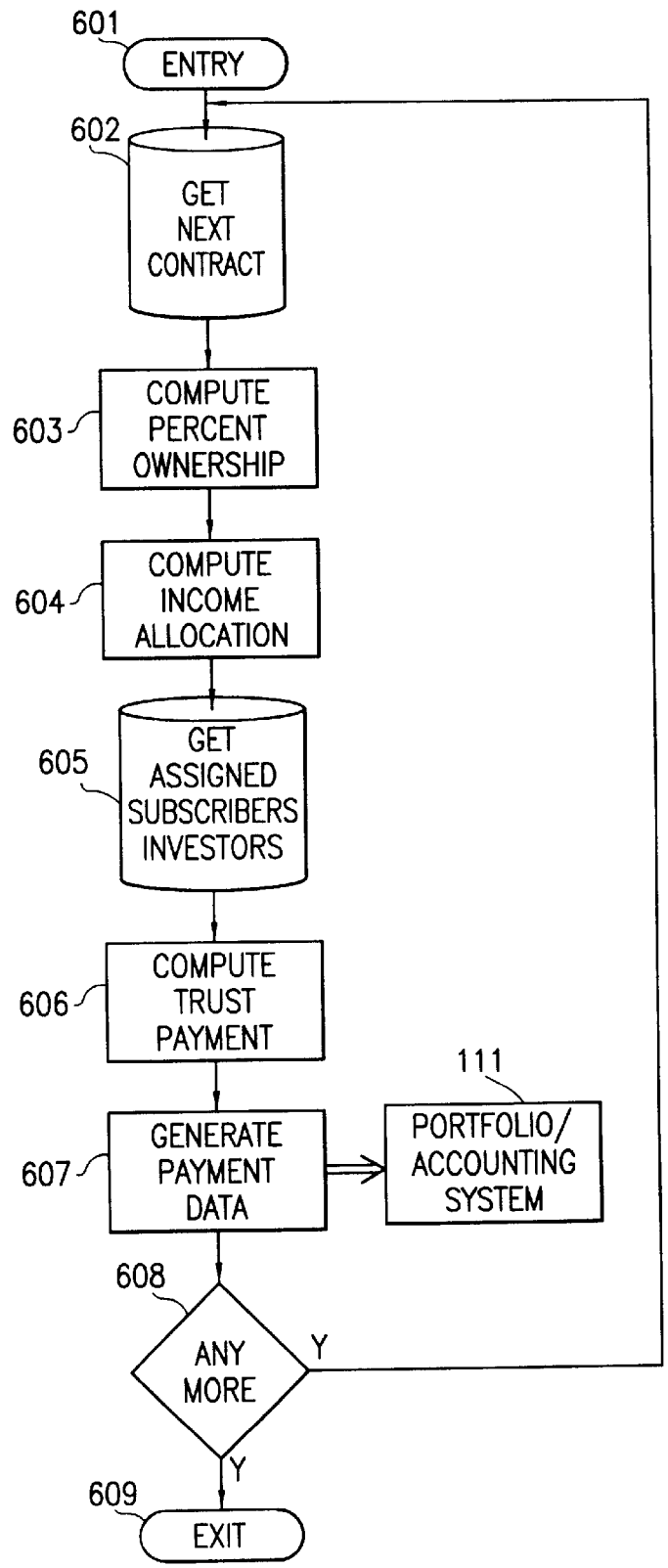
Figure 11B:
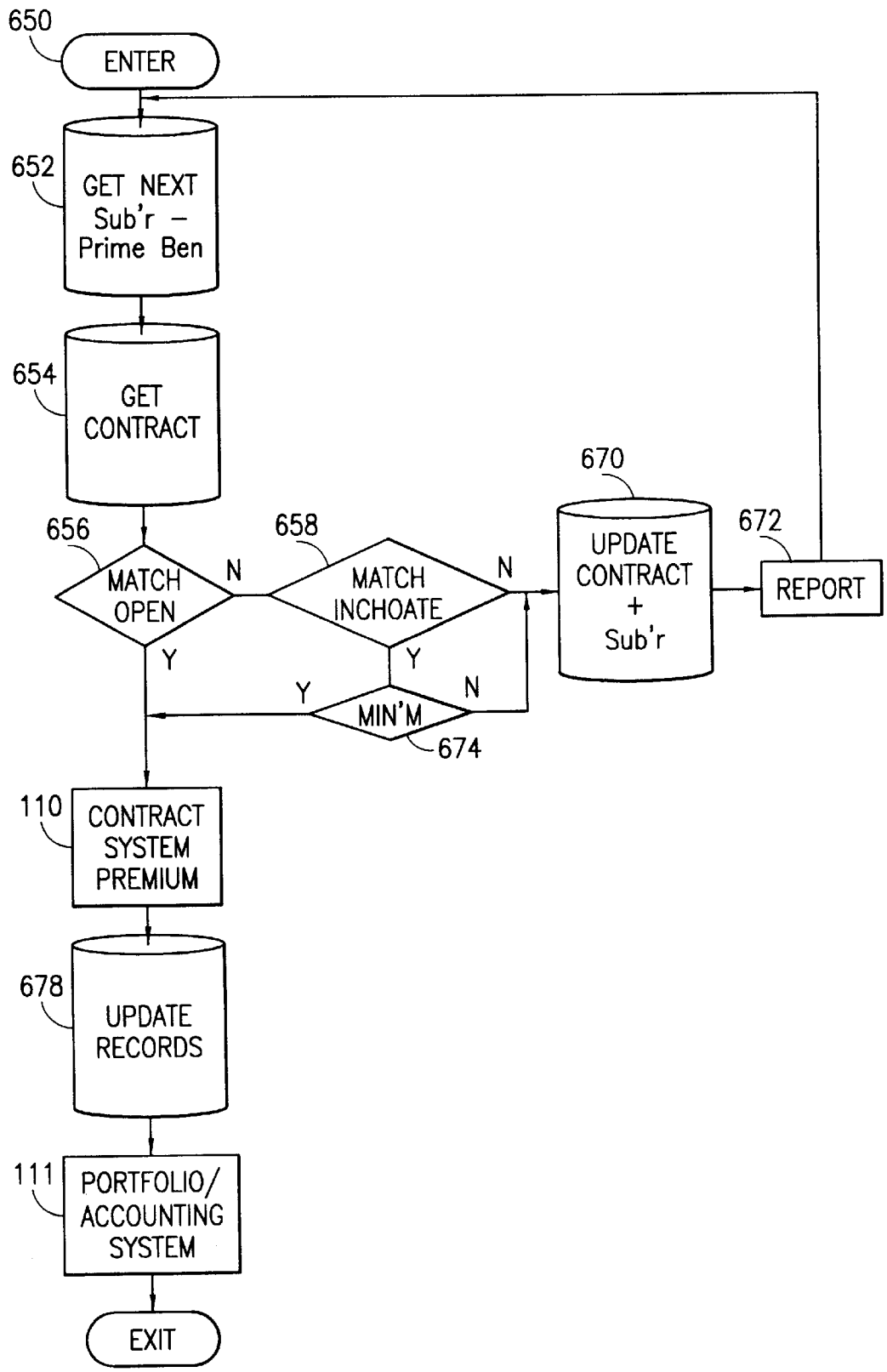
Figure 12:
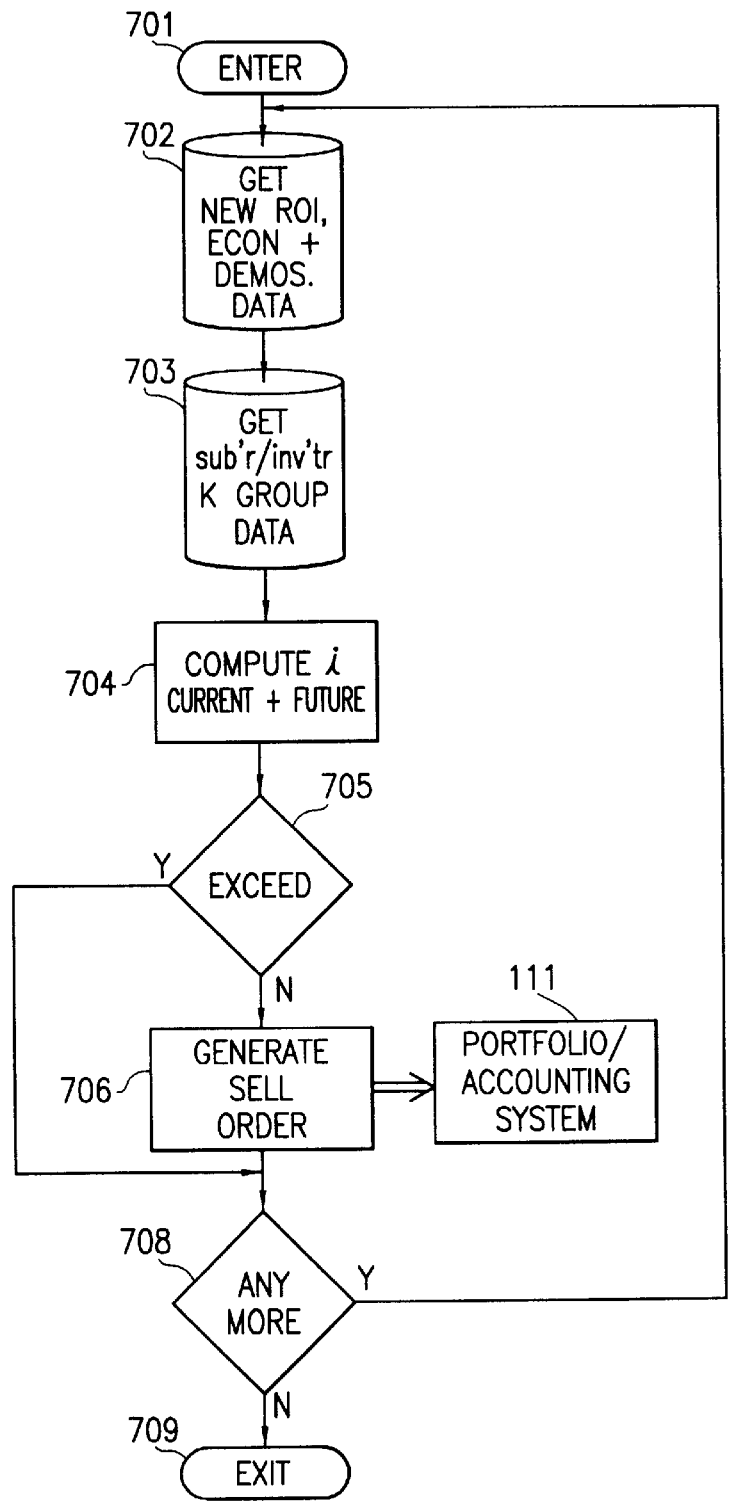
FIG. 12 is a flowchart depicting increasing income payment processing and investment processing to meet target increasing income levels.

FIGS. 11A, 11B and 12 are flowcharts depicting processing of increasing income payments and reporting of the portfolio/accounting system, processing new contracts, and increasing income payments processing and investment processing to meet income target values or target increasing income levels.

FIG. 11A and processing steps 602 through 607 review, each open contract which has been triggered and is in the "inception" period, computes the percent ownership of the subscriber/beneficiary, computes the income allocation from the fund of money for the respective contract group, fetches the subscribers/beneficiaries' record, computes "i" payment and generates payment data. The payment generation data is sent to portfolio/account system such that the administrator, via the computerized system for maintaining and monitoring the increasing income financial product, issues a paper or an electronic check to the surviving beneficiary associated with a particular contract group. The test 608 determines whether there are any additional open contracts subject to payment of the increasing income feature.

It should be noted that the contract, during the inception period, may have a "no-payment" period or a "constant level income" period. With a no-payment for a certain term of years contract, the income generated by the principal associated with a particular contract group accumulates during the quiet or "no payment" term thereby increasing the overall value to the contract group as well as to the beneficiaries. For example, an increasing income financial product purchased by a 30 year old may not pay any income for a period of 25 years, that is, until the subscriber/beneficiary reaches 55. All beneficiaries are 30 years old at inception. At this 55 year old age, the subscriber/beneficiary may be interested in retirement. During the 25 years, accumulated income greatly increases the total value of the financial product for the beneficiary. In contrast, a 50 year old purchasing the increasing income product may wish a "constant level" income stream from his or her investment for a period of 15 years. Thereafter, the investor/beneficiary may want an increasing income financial benefit from the financial product. In the case of a 30 year old when he or she reaches 55, the subscriber/beneficiary may want to activate the increasing income feature. Some of these concepts are set forth below in the First Tier Income Payment Plan Table.

First Tier (Income) Payment Plan Table increasing income based upon number of subscribers alive in contract group (full "i" return less % retainage less mgt.fee)

increasing income with floor or ceiling (with or without invasion of principal)

increasing income after term of years (elimination period T prior to i payments to primary beneficiaries)

increasing income for life of husband and wife, both designated as a primary beneficiary Upon the death of a primary beneficiary, the increasing income financial product may further include a contract parameter which provides some (a) benefit to the secondary beneficiary or beneficiaries (herein, reference will be made to a beneficiary however such reference also refers a plurality of beneficiaries); or (b) the ability of the secondary beneficiary to redeem the remaining value of the principal at an earlier time than the formal expiration of the contract. In the event of early redemption, the returned principal is greatly discounted. As described earlier, the contract may expire at (a) the death of all primary beneficiaries in a contract group, (b) a predetermined or preset time from inception of the contract; (c) a predetermined time from closure of the contract; (d) or any other contractually identified event. In the event the secondary beneficiary wishes to withdraw principal established by the initial subscriber prior to contract expiration, the following Second Tier or Intermediate Payment Plan Table provides some option.

Second Tier (Intermediate) Payment Plan Table no payments until contract expires (death of subscribers or term of years)

nominal, periodic payments until contract expires lump sum payment fully discounted to reflect survivors in K group, present actuarial or demographic mortality rates and tables less % retainage At the expiration of the contract, the secondary beneficiary may be presented with several options regarding utilization of the principal. Some of these options are set forth in the Tertiary or Third Tier Payment Plan Table set forth below.

Tertiary or Third Tier Payment Plan Table lump sum annuity term of years or life any other legal distribution method with or without tax planning The secondary payment plans and tertiary payment plans may be implemented and offered as part of the computerized system to maintain the increasing income financial product at steps 319 through 323 in FIG. 4.

FIG. 11B provides a flowchart showing the major process steps for associating a contract or a contract group with a primary beneficiary established by a subscriber. Functional steps 652, 654 fetches subscriber and primary beneficiary data in contract data from the relevant record files. Test 656 determines whether an open contract matches with the demographics or characteristics of a primary beneficiary. If not, test 658 determines whether the primary beneficiary characteristics match any inchoate contracts. Inchoate contracts, as used herein, referred to contracts that have been placed "on hold" wherein the system administrator has accepted funding from a subscriber but has not opened a increasing income contract. Inchoate contracts refer to contracts which have not entered the inception phase due to minimum number of subscribers/beneficiaries minimum investment amounts or other reasons and further relates to contracts wherein the administrator has financial obligations to the funding subscribers prior to inception of the increasing income contract. Generally, those obligations include a return of funds. If no matches is found with the primary beneficiary and any existing contracts marked inchoate, the NO branch is taken and the contract and subscriber records are updated in process steps 670. A report is generated in step 672 both electronically and, preferably in print, indicating to the subscriber and the designated primary beneficiary of the incomplete or incipient nature of the increasing income contract. This enables the subscriber/beneficiary to request a refund or a redemption of his or her funds.

If an inchoate contract match is found, the system executes test 674 which determines whether the inchoate contract group exceeds the contract inception parameters. As stated earlier, these contract inception parameters may include minimum numbers of subscribers/beneficiaries, minimum total investment for a contract group, or other identifiable contractual parameters. If so, the system in test 674 executes the contract system premium function block 110. The same result is obtained from test 656 wherein a match is found between the primary beneficiary and any open increasing income contracts. Referring briefly to test 674, if the minimum inception parameters in a contract are not met, the system updates the relevant records in function block 670. The contract system function block 110 particularly identifies the premium payments as specified earlier in connection with FIG. 7. Function block 678 updates relevant records and function block 111 relating to the portfolio/accounting system and invests the new subscriber's funds with the other contract group members.

FIG. 12 shows a flowchart for monitoring contract funds in other to achieve income target values or target increasing income levels. As stated earlier, these increasing income targets may be guaranteed or may be simply suggested in the contractual terms established by the administrator. In function block 702, the system obtains new return on investment ROI information, new economic information and new demographic information as necessary to monitor the total investments and mix of investments by the administrator. Step 703 fetches subscriber/investor information in contract group data. The computation of increasing income in both a current sense and a future sense is determined in function block 704. Since a broad base increasing income financial product will require funds for redemption within 30–60–90 days as well as other exceptional circumstances (for example those set forth above in the secondary payment plan), it is advisable to maintain the financial stability of the financial product and to compute current cash flow needs for redemptions and increasing income contractual payments as well as long term payments. Step 704 recognizes that if financial products guarantee a minimum increasing income level through the life of a particular primary beneficiary group, the financial system must monitor the quality of return on investment for each investment and also monitor, for example, the death rate or demographic data of a particular contract group in order to meet the suggested or contractually implemented and/or guaranteed increasing income target levels.

Step 705 determines whether the current investment meet the income target values on the basis of each contract group as well as on the basis of the entire financial product system. If not, test 706 generates sell orders and activates the portfolio accounting system function block 111. If YES, the system tests in step 708 whether there are any additional investment items to be reviewed. The system exits in step 709.

Figure 13:
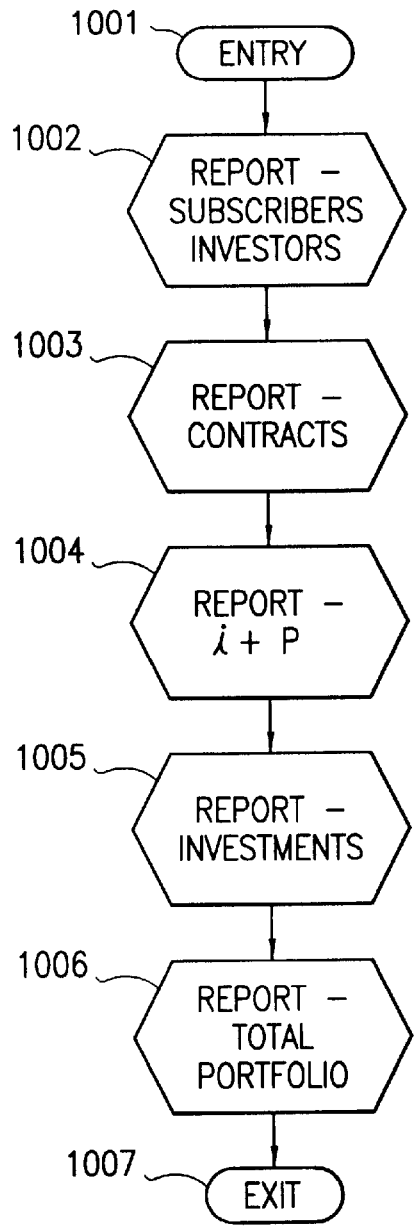
FIGS. 13 and 14 are flowcharts depicting investment report processing and housekeeping system.

A detailed description of the reporting means is depicted in FIG. 13. Reporting means processing begins at block 1001 and ends at block 1007, after which the system exits from its processing for this period, as indicated in FIG. 2 at block 212. Subprocess steps at blocks 1002 to 1006 generate reports on all entities stored by the system in disk storage 103. These entities are listed in Table 1 and shown in the drawing as subscriber/beneficiary/investor reports, (e.g. remaining beneficiaries) income "i" and principal "P" reports to specific beneficiaries, general reports on the condition of investments, and total portfolio performance (for system and specifically for investor).

Figure 14:
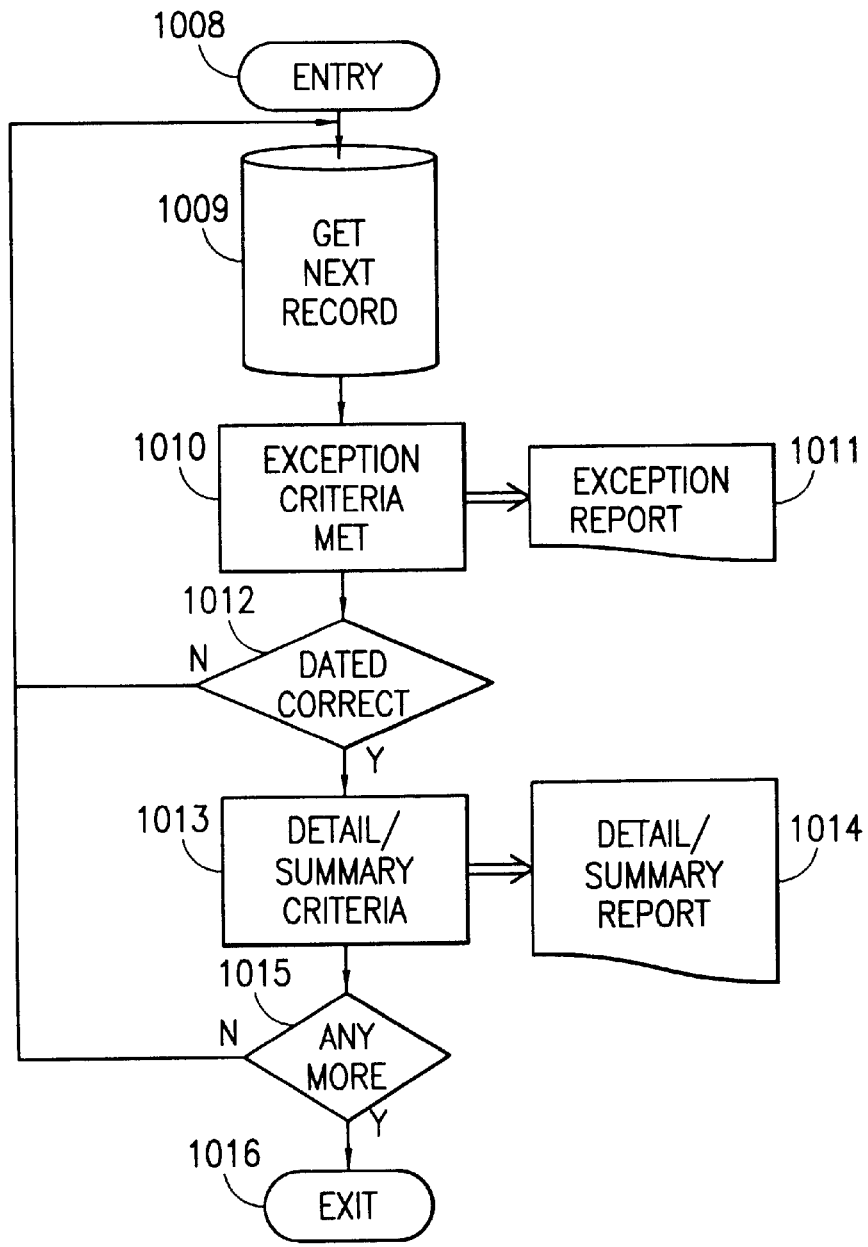

FIG. 14 details these report subprocesses, one for each type of entity. They begin processing at block 1008 and exit at block 1016. Beginning with a storage area fetch at block 1009, the system proceeds through block 1015 to implement a scan of all storage areas of the particular entity stored in disk storage 103. At block 1010, the system generates exception reports requiring immediate auditing or administrative attention. For example, exception conditions for subscribers may include a missed premium payment by subscriber/investor; for investments, an out of limit ROI condition, etc. For the correct date, which may be weekly, quarterly, yearly, etc., at block 1013 the system generates detail reports, for example listing all entity instances, and summary reports, for example providing totals of various quantities of interest.

This claims appended hereto are meant to cover modifications and changes within the scope and spirit of the present invention.

What is claimed is:

1. A computerized method, utilized by an administrator, for monitoring and maintaining a financial product, purchased by a plurality of subscribers, paying increasing income to a plurality of primary beneficiaries based upon their comparable survival in a predetermined group including the steps of:

providing a computer system for processing transactions, including payments by said subscribers, investments and increasing income payments, and for reporting the status of beneficiary accounts;

monitoring, via said computer system, the establishment of a plurality of contracts for a corresponding plurality of primary beneficiaries, each primary beneficiary of said plurality of primary beneficiaries designating a corresponding secondary beneficiary;

segregating, via said computer system, said plurality of primary beneficiaries into a plurality of contract groups, each contract group utilizing one contract of said plurality of contracts, wherein each primary beneficiary of a respective contract group has (i) substantially similar demographics as compared with others in the same contract group, and (ii) a similar contract compared with others in the same contract group;

monitoring, via said computer system, compliance with contractual parameters which parameters define unique attributes of a respective contract of said plurality of contracts for said respective contract group, said contractual parameters including:
(i) at least one inception parameter,
(ii) financial obligations of said administrator prior to inception, (iii) a closure parameter including one from the group of a maximum number of primary beneficiaries in said contract group, a total monetary limit associated with said respective contract for said respective contract group, and a predetermined time period factor, (iv) an expiration parameter including at least one from the group of death of all primary beneficiaries in said respective contract group, time from inception, and time from closure, (v) the presence or absence of an income target value, said income target value including factors relative to income generation from a predetermined investment, prospective and realized capital gain, and an investment time factor associated with said predetermined investment; and, (vi) invasion of principal parameter;

directing, via said computer system, the investment of funds created by said payments by said subscribers on behalf of said primary beneficiaries in compliance with said contractual parameters for said plurality of contracts;

directing and reporting, via said computer system, the payment of increasing income to primary beneficiaries surviving others in said respective contract group of said plurality of contract groups; and, directing and reporting, via said computer system, the payment of principal to said secondary beneficiaries upon the occurrence of one of the aforementioned expiration parameters established in said respective contract for said respective contract group.

2. A computerized method for monitoring and maintaining a financial product as claimed in claim 1 wherein said step for monitoring compliance includes monitoring compliance with one or more inception parameters from the group including a minimum number of primary beneficiaries in said contract group, a minimum monetary limit associated with said respective contract for said respective contract group, and a predetermined time from acceptance of payment from a subscriber on behalf of a primary beneficiary.

3. A computerized method for monitoring and maintaining a financial product as claimed in claim 2 including the step of refunding and reporting, via said computer system, all payments made by a respective subscriber on behalf of a corresponding primary beneficiary upon determining, via said step of monitoring compliance, that said respective contract, associated with a respective contract group, does not meet or exceed the inception parameter associated with said respective contact.

4. A computerized method for monitoring and maintaining a financial product as claimed in claim 1 including the steps of computing a return on investment as part of the step of directing the investment of funds in compliance with said contractual parameters; projecting said return on investment over a predetermined future time period and determining whether said return on investment and the projected return on investment is less than a predetermined value.

5. A computerized method for monitoring and maintaining a financial product as claimed in claim 4 wherein said respective contract includes the presence of said income target value.

6. A computerized method for monitoring and maintaining a financial product as claimed in claim 1 wherein, in said step of monitoring compliance, said inception parameter relates to the beginning of an accumulation of income time period which will, at some time in the future, support increasing income payments to surviving primary beneficiaries in a respective contract group.

7. A computerized method for monitoring and maintaining a financial product as claimed in claim 6 wherein, in said step of monitoring compliance, said closure parameter relates to a predetermined closure event which, as a result thereof, said administrator is contractually prohibited from placing additional primary beneficiaries into said respective contract group.

8. A computerized method for monitoring and maintaining a financial product as claimed in claim 7 wherein, in said step of monitoring compliance, said expiration parameter relates to the end of said accumulation of income time period and payment of increasing income payments to surviving primary beneficiaries in a respective contract group, and an occurrence of said expiration parameter event triggering said step of directing and reporting the payment of principal.

9. A computerized method for monitoring and maintaining a financial product as claimed in claim 8 wherein said step of monitoring compliance includes the presence of said income target value.

10. A computerized method for monitoring and maintaining a financial product as claimed in claim 9 wherein, in said step of monitoring compliance, said invasion of principal parameter relates to said administrator utilizing said subscriber payments to pay increasing income to primary beneficiaries surviving others in said respective contract group.

11. A computerized method for monitoring and maintaining a financial product as claimed in claim 10 including the steps of computing a return on investment as part of the step of directing the investment of funds in compliance with said contractual parameters; projecting said return on investment over a predetermined future time period and determining whether said return on investment and the projected return on investment is less than a predetermined value.

* * * * *